(12) United States Patent
Kim et al.

(10) Patent No.: US 7,488,376 B2
(45) Date of Patent: Feb. 10, 2009

(54) VEHICLE CANISTER

(75) Inventors: Jin Kyu Kim, Gyeonggi-do (KR); Min Yong Park, Gyeonggi-do (KR); Sang Hoon Park, Chungcheongnam-do (KR); Joon Won Min, Chungcheongnam-do (KR)

(73) Assignee: Daeki Corporation (KR)

( * ) Notice: Subject to any disclaimer, the term of this patent is extended or adjusted under 35 U.S.C. 154(b) by 282 days.

(21) Appl. No.: 11/589,383

(22) Filed: Oct. 30, 2006

(65) Prior Publication Data
US 2007/0101865 A1    May 10, 2007

(30) Foreign Application Priority Data
Nov. 8, 2005    (KR)    ...................... 10-2005-0106564

(51) Int. Cl.
B01D 53/02    (2006.01)
F02M 33/02    (2006.01)
(52) U.S. Cl. ............................. 96/134; 123/519; 96/136
(58) Field of Classification Search ........... 96/134–136, 96/139, 141, 144, 146, 152; 123/518–820
See application file for complete search history.

(56) References Cited

U.S. PATENT DOCUMENTS 4,919,103 A * 4/1990 Ishiguro et al. ............. 123/519
5,355,861 A * 10/1994 Arai ........................... 123/519
6,230,693 B1 * 5/2001 Meiller et al. ............... 123/519
6,279,548 B1 * 8/2001 Reddy ........................ 123/520
6,689,196 B2 * 2/2004 Amano et al. ............... 123/519
6,695,896 B2 * 2/2004 Hara et al. ................... 123/519
6,863,714 B2 * 3/2005 De Biasio ................... 123/519
6,942,721 B2 * 9/2005 Oh et al. ..................... 123/519

* cited by examiner

Primary Examiner—Stephen K Cronin
Assistant Examiner—Arnold Castro
(74) Attorney, Agent, or Firm—St. Onge Steward Johnston & Reens LLC

(57) ABSTRACT

The vehicle canister comprising: the first chamber filled with the active carbon and funneled with the tank port, where the evaporating gas is infused through and the second chamber filled with the active carbon and funneled with the atmosphere port and neighboring the first chamber via the isolation wall. Also, it involves the vehicle canister installed in the canister housing which has the absorption and desorption improver to improve the absorption and desorption efficiency with heat conduction with temperature change of the active carbon occurred during the absorption and desorption of evaporation gas infused into the canister housing. The absorption and desorption improver is composed with the first and the second absorption and desorption improver.

10 Claims, 7 Drawing Sheets

[Table 1]

| Evaluation Item | | Evaluation Results (mmAq) | | |
|---|---|---|---|---|
| | | Canister A | Canister B | Canister C |
| Draft Resistance | Below-Atmospheric Pressure | 24 | 22 | 18 |
| | ORVR | 56 | 48 | 46 |

[Table 3]

| Times of Expirement | Canister A | | Canister B | | Canister C | |
|---|---|---|---|---|---|---|
| | Weight (g) | | Weight (g) | | Weight (g) | |
| | Absorption | Desorption | Absorption | Desorption | Absorption | Desorption |
| 1 | 255.3 | 99.6 | 261.4 | 88.7 | 244.7 | 124 |
| 2 | 274.5 | 120 | 272.6 | 97.3 | 247.6 | 127.6 |
| 3 | 280.1 | 125.2 | 276.5 | 101.2 | 249.5 | 130.6 |
| 4 | 285.7 | 150.3 | 281.5 | 105.9 | 254.9 | 135.5 |
| 5 | 287.4 | 144 | 282.3 | 107.1 | 260.6 | 141 |
| 6 | 286.3 | 131.8 | 276.3 | 107.5 | 262.7 | 142.7 |
| 7 | 287.6 | 133.8 | 281.7 | 110.1 | 264.3 | 145.2 |
| 8 | 292.3 | 138.3 | 284.7 | 114.0 | 266.1 | 146.5 |
| 9 | 296.0 | 141.9 | 287.9 | 117.4 | 267.9 | 149.1 |
| 10 | 299.9 | 141.9 | 291.4 | 115.4 | 271.1 | 148.7 |
| BWC (Butane Woking-Capacity) | 158.0 | | 174.2 | | 121.4 | |

FIG. 3c

VEHICLE CANISTER

CROSS-REFERENCE TO RELATED APPLICATIONS

This application claims priority to and the benefit of Korean Patent Application No. 10-2005-0106564, filed on Nov. 8, 2005, the entire content of which is incorporated herein by reference.

FIELD OF THE INVENTION

The present invention relates to the vehicle canister, and more particularly to a vehicle canister, in which the active carbon is filled inside of the canister housing which improves the ability of absorption and desorption of the active carbon. The absorption and desorption improver is composed of the first and the second absorption and desorption improver.

BACKGROUND OF THE INVENTION

Generally, the gasoline filled in the fuel tank of vehicle sends to the engine by the fuel pump, and the fuel not used returns back to the fuel tank. The temperature of the returned fuel is elevated with the heat of engine when it stays in the engine, the surrounding temperature is highly elevated like in summer, and the temperature of gasoline is further higher.

As described, as the temperature of gasoline is elevated, the evaporating gas is formed, and the main component of the evaporating gas is hydrocarbon (HC), thus if it fills the entire space of the fuel tank, it escapes through the drain line combined with the fuel tank, and the canister is the repository to collect the evaporating gas produced in the fuel tank.

The canister absorbs the harmful evaporating gas out of the fuel tank of the vehicle with the active carbon filled in the canister and stores it, and if the engine is activated and RPM (resolution per minute) is elevated, then transfers the stored absorbed gas to the engine, and burns it, to prevent the loss of the fuel in the fuel tank.

The active carbon containing multiple porosity fills the canister and the important role of the canister is to absorb the evaporating gas into multiple porosity in the active carbon in the canister thus if the air is infused from outside, it separates the harmful gas absorbed in the active carbon and evacuate it outside. If the evaporating gas is infused into the canister, the active carbon absorbs the evaporating gas, that causes abrupt exothermic reaction, and the temperature of the active carbon is elevated.

Adversely, if the evaporating gas is emitted, due to the below atmospheric pressure of the fuzzy port, the active carbon filled in the canister secedes the evaporating gas, the temperature of the active carbon is lowered.

In the vehicle canister, the abrupt exothermic reaction happened at the absorption by the active carbon filled in the canister decreases the absorption efficiency of the active carbon, and the abrupt decrease of the temperature at emission by active carbon filled in the canister causes the problem of decrease of the emission efficiency of the active carbon. The abrupt change of temperature in the canister causes the inhibition of harmonious absorption emission action of the active carbon, so if the canister is used long time, the absorption and desorption efficiency of the active carbon is decreased markedly.

The invention is designed to resolve the above described problem and provides the vehicle canister, containing the absorption and desorption improver filled with the heat accumulation material in the canister housing in which the phase is changed with the change of temperature when the active carbon filled in the housing and it increases the efficiency of the active carbon, Also, the invention prevents abrupt change of temperature during the absorption and process of evaporating gas by active carbon filled in the canister housing.

SUMMARY OF THE INVENTION

Accordingly, the present invention has been made to keep in mind the above problems occurring in the prior art, and an object of the present invention is to provide a vehicle canister, in which;

The canister housing, which improved the ability of absorption and desorption of the active carbon, in which active carbon is filled therein, comprising; a heat accumulate material is charged in the absorption and desorption improver; the heat accumulate material is able to phase change in accordance with the temperature change at the time of the active carbon is absorption and desorption.

The active carbon containing multiple porosity fills the canister and the important role of the canister is to absorb the evaporating gas into multiple porosity in the active carbon in the canister, thus if the air is infused from outside, it separates the harmful gas absorbed in the active carbon and evacuate it outside. If the evaporating gas is infused into the canister, the active carbon absorbs the evaporating gas, that causes abrupt exothermic reaction, and the temperature of the active carbon is elevated.

Adversely, if the evaporating gas is emitted, due to the below atmospheric pressure of the fuzzy port, the active carbon filled in the canister secedes the evaporate gas, the temperature of the active carbon is lowered.

In the vehicle canister, the abrupt exothermic reaction happened at the absorption by the active carbon filled in the canister decreases the absorption efficiency of the active carbon, and the abrupt decrease of the temperature at emission by active carbon filled in the canister causes the problem of decrease of the emission efficiency of the active carbon, The abrupt change of temperature in the canister causes the inhibition of harmonious absorption emission action of the active carbon, so if the canister is used long time, the absorption and desorption efficiency of the active carbon is decreased markedly.

The object of the invention is to provide the canister housing, which improved the ability of absorption and desorption of the active carbon, in which active carbon is filled therein, the heat accumulate material is charged in the absorption and desorption improver; the heat accumulate material is able to phase change in accordance with the temperature change at the time of the active carbon is absorption and desorption.

Another object of the present invention is to prevent the decrease of absorption ability and durability of the active carbon in spite of long time use of it by prevent the rapid change of the temperature of active carbon in the procedure of absorb and diffusion of the active carbon which filled in the canister housing.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 3a to FIG. 3c are the diagram of the result of comparative experiment of the vehicle canister in prior art and according to the preferred embodiment of the present invention;

DETAILED DESCRIPTION OF THE INVENTION

A vehicle canister according to the present invention comprising; a canister housing contains the first chamber which filled with the active carbon inside and connecting with the tank port of which inlet the evaporate flow gas; and second chamber which filled with the active carbon and adjoining mounted with the first chamber via a partition wall;

The absorption and desorption improver is installed in the canister housing, receiving the heat transfer from the temperature change of the absorption and desorption of the evaporate gas flow inlet and improve the absorption and desorption efficiency of the active carbon.

The absorption and desorption improver includes the first absorption and desorption improver positioned in the first chamber and the second absorption and desorption improver positioned in the second chamber.

The first absorption and desorption improver contains the heat accumulate materials which is able to phase change, therein; It is desirable to use the liquid state sodium thiosulfate ($Na_2S_2O_3 \cdot 5H_2O$) as heat accumulate material and be filled in the first and second absorption and desorption improver.

Also, it is possible to use a liquid state sodium phosphate ($Na_2HPO_4 \cdot 12H_2O$) to fill the first and second absorption and desorption improver. In addition to the sodium phosphate ($Na_2HPO_4 \cdot 12H_2O$) and sodium thiosulfate ($Na_2S_2O_3 \cdot 5H_2O$), it is desirable to use the sodium sulfate ($Na_2SO_4 \cdot 10H_2O$), sodium hydroxide ($NaOH \cdot H_2O$), cyanamide ($NCNH_2$) and polyglycol, and at least one or more than one of these materials can be used as the heat accumulate material.

Figure 1:
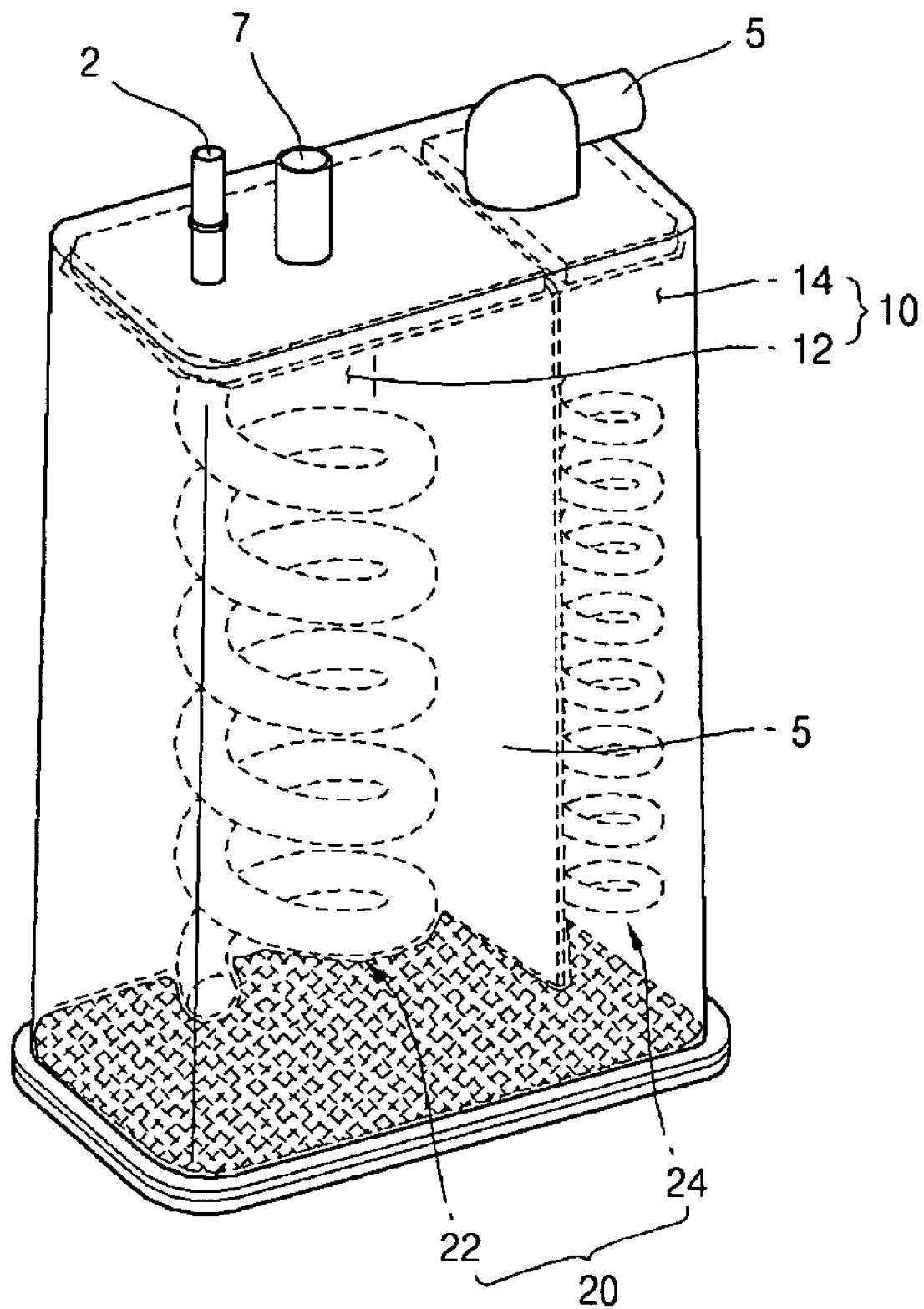
FIG. 1 is a schematic perspective view of the vehicle canister according to the preferred embodiment of the present invention.
Figure 2:
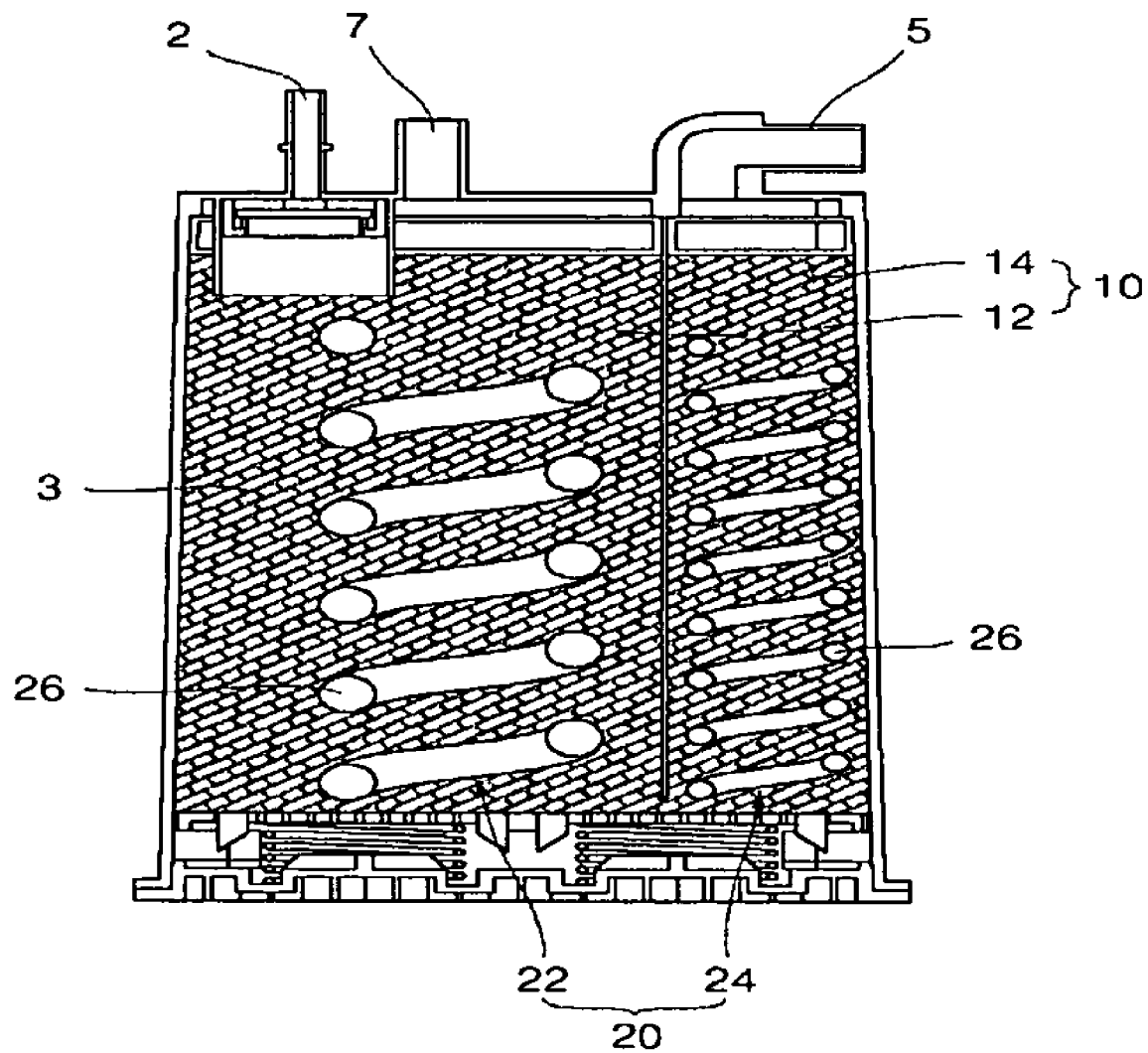
FIG. 2 is a cross sectional view of the vehicle canister according to the preferred embodiment of the present invention.

From now on, let me describe the desirable invention to performed in reference to annexed layout diagram, FIG. 1 is an oblique view of the vehicle canister of the invention and FIG. 2 is a sectional view of the vehicle canister of the invention.

Referring the annexed FIG. 1 or FIG. 2, the vehicle canister of the invention is funneled with the tank port 2, through it evaporating gas is infused in the canister housing 10 and contains the first chamber 12 filled with active carbon 3 (referring FIG. 2); also it is funneled with atmosphere port 5 and contains the second chamber 14 filled with active carbon.

In the canister housing, it contains the absorption and desorption improver 20, which improves absorption and desorption efficiency of the active carbon 3 with heat conduction with the change of temperature during absorption and desorption of evaporating gas infused into the canister housing 10.

The absorption and desorption improver 20 contains; the first absorption and desorption improver 22 located in the first chamber 12, and the second absorption and desorption improver 24 located in the second chamber 14.

The first and second absorption and desorption improver 22, 24 is located in the upper portion of the first and second chamber 12, 14 and extended lower with coil shape and that is the lower portion of the first and second chamber 12, 14.

Furthermore, the other type of the first and second absorption and desorption improver 22, 24 may be tube shape with multiple curvature parts.

The first and second absorption and desorption improver 22, 24 is desirable to have any figure of not disturb the vigorous action of the absorption and desorption action of the active carbon that charged in the canister housing 10. Therefore, the construction of the absorption and desorption improver 22, 24 is can be modified or changed to other construction or figure that is not disturb the absorption and desorption action of the active carbon 3 from besides of the coil shape of the present invention.

It is desirable to use high heat conduction material for the first and second absorption and desorption improver 22, 24, and the material may be copper desirably.

The first and second absorption and desorption improver 22,24 contains the heat accumulate material 26 with phase change in it, and the material may be sodium thiosulfate ($Na_2S_2O_3 \cdot 5H_2O$) or sodium phosphate ($Na_2HPO_4 \cdot 12H_2O$) desirably. In addition to this, it is desirable to use the sodium sulfate ($Na_2SO_4 \cdot 10H_2O$), sodium hydroxide ($NaOH \cdot H_2O$), cyanamide ($NCNH_2$) and polyglycol, and at least one or more than one of these materials can be used as the heat accumulate material.

The heat accumulate material 26 filled in the first and second absorption and desorption improver 22, 24, is filled in the state of liquid or solid, and closed tightly by specially designed joining jig (not shown).

The results of the comparative experiment of the conventional prior art and according to the present invention are described with referred to the drawings;

The comparative experiment is conducted in the state of, the canister of the conventional prior art is filled with active carbon only and the vehicle canister according to the present invention is installed the first and second absorption and desorption improver which is filled with the heat accumulation material.

Figures 3A, 3B:
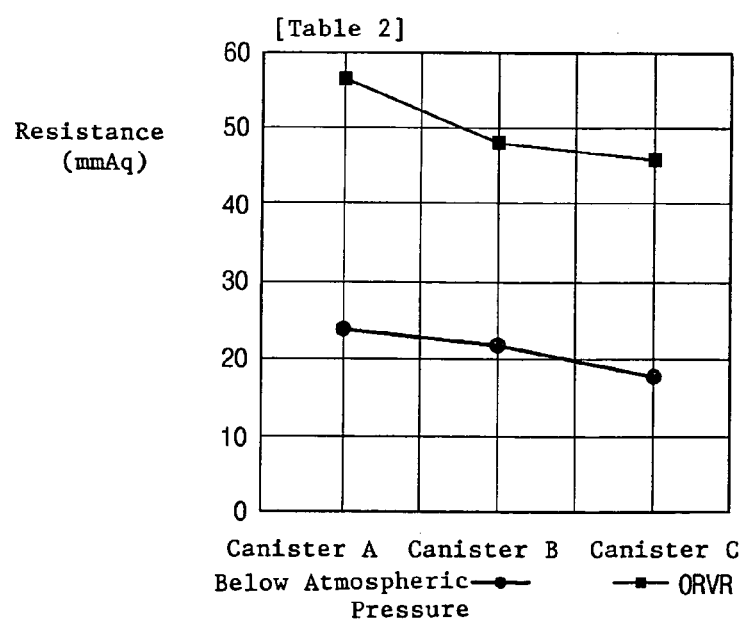

Referred to the table 1 of FIG. 3a, the first experiment is the illustration of the result assessing the draft resistance of each canister. The draft resistance is assessed in two conditions of experiment, which are the below atmospheric pressure and ORVR (On-Board Refueling Vapor Recovery) (resistance in the canister during fueling into the tank). The assessment condition of the below atmospheric pressure is to measure the resistance in the canister housing 10, when the air is infused at the rate of 10 l/min from the fuzzy port 7 (referring FIG. 1), which is controlled in condition of closing nipple 7 (not shown) on the tank port 2 (not shown).

The assessment condition of the ORVR is to measure the resistance in the canister housing 10 when the air is infused from the fuel tank to the tank port 2 (referring FIG. 1) at the volume of 45 l/min, which is controlled in condition of closing the nipple (not shown) on the fuzzy port 7 (referring FIG. 1). The canister A is filled with sodium thiosulfate ($Na_2S_2O_3 \cdot 5H_2O$) in the first and second absorption emission improver 22, 24, the canister B is filled with sodium phosphate ($Na_2HPO_4 \cdot 12H_2O$), and the canister C is filled with only the active carbon, in experiment. If experimented, respectively, in the condition, the data, illustrated in table 1 in FIG. 3a is produced. Referring the annexed table 1 in FIG. 3a, the measurement of the below atmospheric pressure and ORVR in the canister C is recorded as 18 mmAq, and 46 mmAq respectively, that in the canister A is recorded as 24 mmAq and 56 mmAq, and that in the canister B is recorded as 22 mmAq and 48 mmAq.

The annexed table 2 in FIG. 3b reveals the data results illustrated in table 1 in FIG. 3a, and the measurement record of the below atmospheric pressure, and ORVR in the convention canister C, which shows little difference from the data of the canister filled with sodium thiosulfate ($Na_2S_2O_3.5H_2O$) and sodium phosphate ($Na_2HPO_4.12H_2O$) as heat accumulation material.

The difference means, during using the canister in a vehicle actually, that it can be used with little difference from the draft resistance during fueling. Referring the annexed table 3 in FIG. 3c, the second experiment shows the experiment about BWC (Butane Working Capacity) measuring the gathering amount of hydrocarbon in the canister using butane and nitrogen mixed gas in the ratio 1:1.

The loading condition about the other assessment condition of the BWC is the experiment, in which the butane is expired out to atmosphere port in condition to 40+±2 g/Hr. The fuzzy condition, the other assessment condition of the BWC, experiments the condition in which it fuzzy in condition of 22.7 l/min using the canister bench aging tester (not shown).

Thus, the loading condition is the condition, in which, when the canister is actually installed in vehicle, absorbing the evaporating gas into the canister housing and the fuzzy condition means the diffusion condition. If experimenting in this condition, the data illustrated in table 3 in FIG. 3c is produced, and referring the data, the canister A is filled with sodium thiosulfate ($Na_2S_2O_3.5H_2O$) in the first and second improver, the canister B is filled with sodium phosphate ($Na_2HPO_4.12H_2O$), and the canister C is filled with only active carbon in it.

When the data was produced after 10 times of experiments in toto, the result of experiment produced the data like table 3, and then after measuring BWC in standard condition of the conventional canister C, the average absorption emission of the active carbon about 10 times of experiments in toto recorded 121.4 g.

Compared with this, in the canister A of the invention where sodium thiosulfate ($Na_2S_2O_3.5H_2O$) is filled in the first and second absorption and desorption improver 22, 24, the average of 10 times of experiments weighing the weight (g) with the absorption and desorption action in 158.0 g and the canister B which filled with sodium phosphate ($Na_2HPO_4.12H_2O$) is recorded 174.2 g.

That means, the data which shows the efficiency of BWC is increased, is produced, in the canister of the invention A, B compared with the conventional canister, it proves that the heat accumulation material, sodium thiosulfate ($Na_2S_2O_3.5H_2O$), and sodium phosphate ($Na_2HPO_4.12H_2O$) is effective to improve the efficiency of absorption and desorption in the canister.

In addition to the heat accumulation material describes above, it is desirable to use the sodium sulfate ($Na_2SO_4.10H_2O$), sodium hydroxide ($NaOH.H_2O$), cyanamide ($NCNH_2$), polyglycol, and so on, and in this experiment, the sodium phosphate ($Na_2HPO_4.12H_2O$) and sodium thiosulfate ($Na_2S_2O_3.5H_2O$), are used as the heat accumulate material for instance.

Then, it is elucidated, the experiment using butane and nitrogen is the experiment that these are replaced with the gasoline, actually used in the vehicle.

Figure 4A:
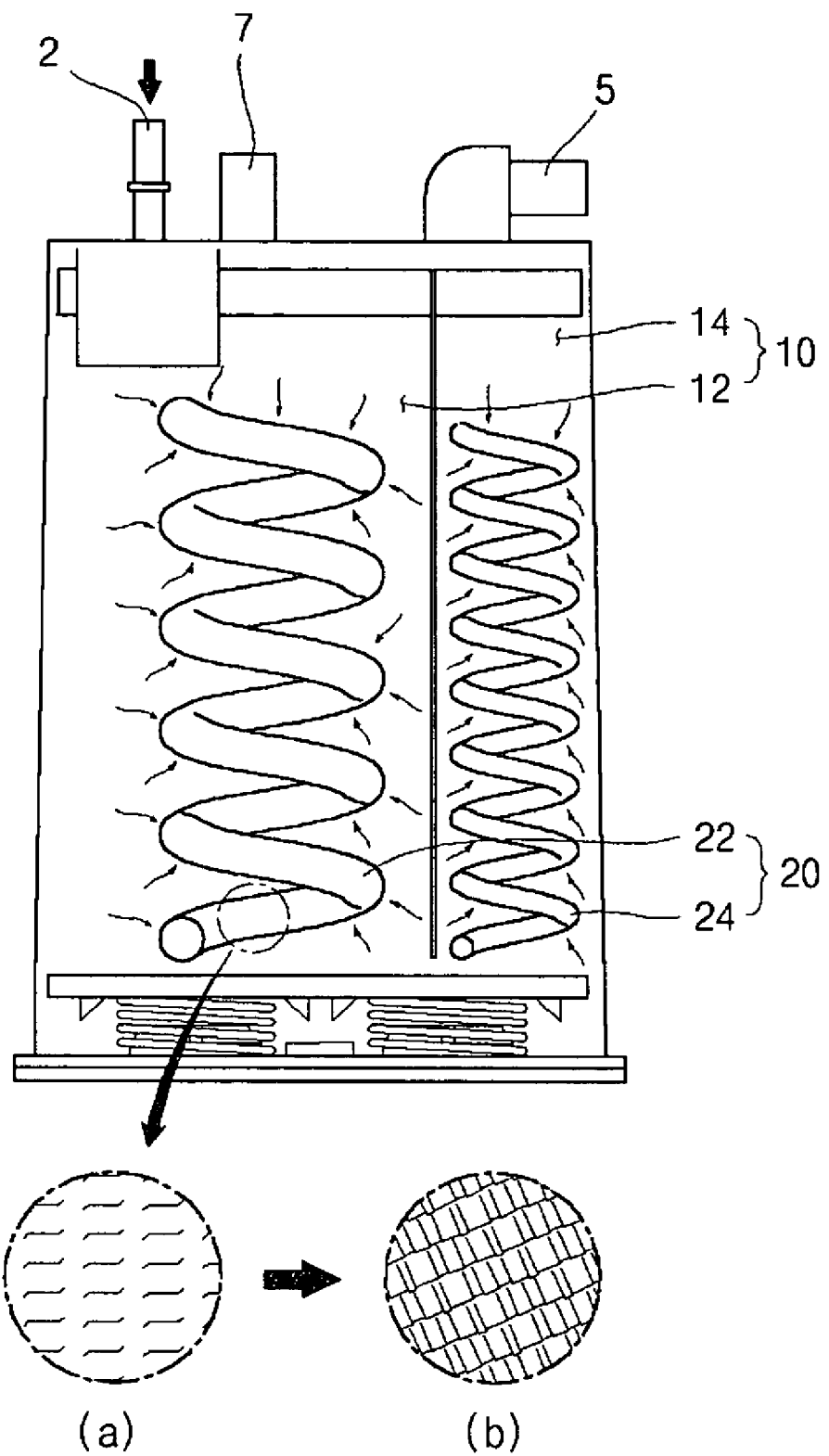
FIG. 4a to FIG. 4b are the views of operating state of the vehicle canister according to the preferred embodiment of the present invention.
Figure 4B:
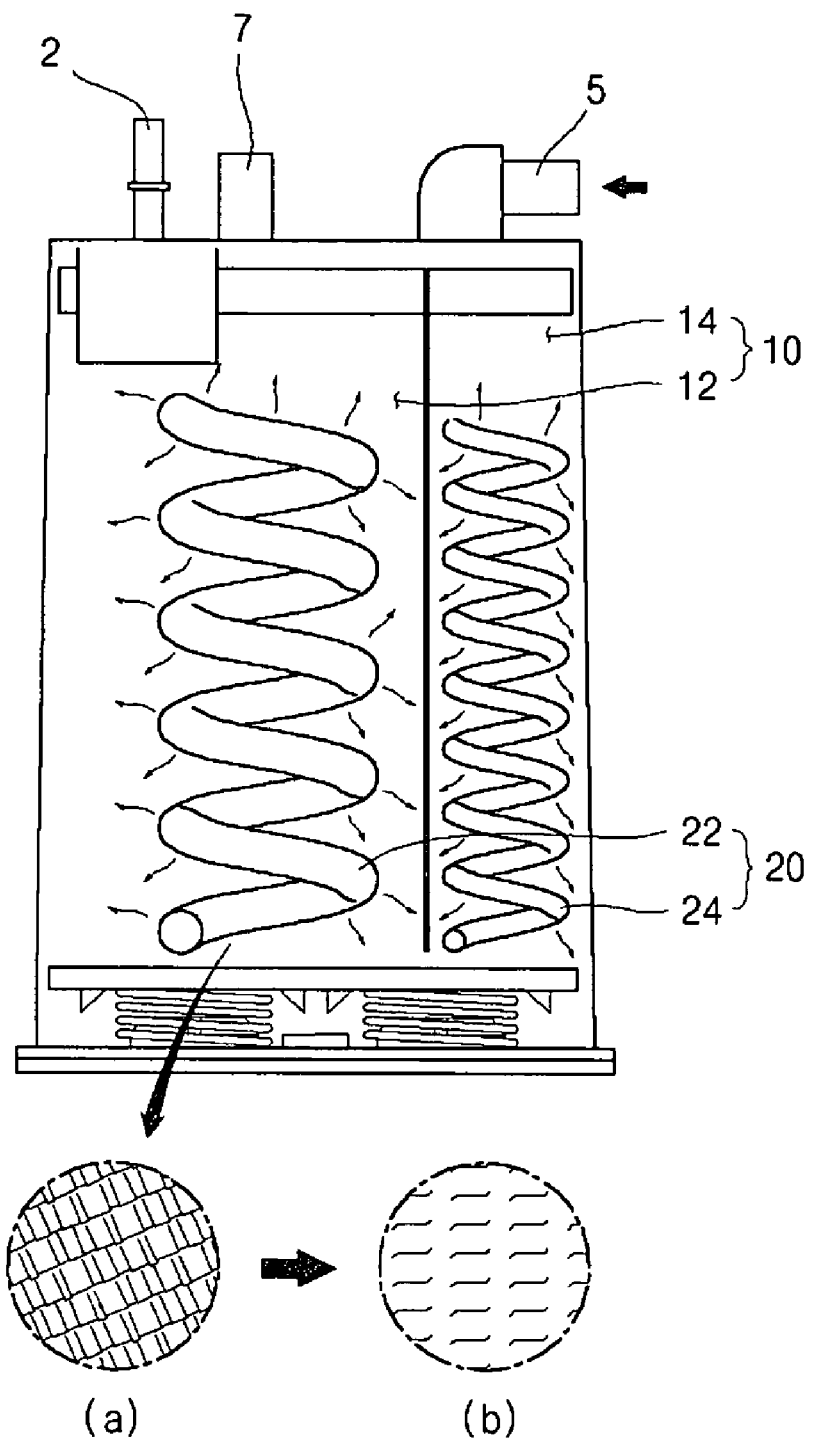

FIG. 4a to FIG. 4b is the view of operating state of the vehicle canister according to the preferred embodiment of the present invention; Referring FIG. 4a; in the absorption and desorption improving tool 20, the first absorption and desorption improver 22 is installed in the first chamber 12, and the second absorption and desorption improver 24 is installed in the second chamber 14.

The heat accumulate material 26 (referring FIG. 2) is mounted on and filled in the first, second absorption and desorption improver 22, 24 and the heat accumulate material 26 thereof is the sodium thiosulfate ($Na_2S_2O_3.5H_2O$), and sodium phosphate ($Na_2HPO_4.12H_2O$).

In addition to the sodium phosphate ($Na_2HPO_4.12H_2O$) and sodium thiosulfate ($Na_2S_2O_3.5H_2O$), it is desirable to use the sodium sulfate ($Na_2SO_4.10H_2O$), sodium hydroxide ($NaOH.H_2O$), cyanamide ($NCNH_2$) and polyglycol, and at least one or more than one of these materials can be mixed to be used as the heat accumulate material.

The sodium phosphate ($Na_2HPO_4.12H_2O$) and sodium thiosulfate ($Na_2S_2O_3.5H_2O$) that filled in the first, second absorption and desorption improver 22, 24 is charged in the coil figured first, second absorption and desorption improver 22, 24 as a liquid state, thus, sealed to maintain the close sealed state by a joint jig (not shown) after the completion of filling. For a convenience to the description, the heat accumulation material filled in the first and second absorption and desorption improver 22,24 is discussed in condition that it is sodium thiosulfate ($Na_2S_2O_3.5H_2O$), when the canister housing 10 with the first and second absorption and desorption improver 22,24 is installed in the vehicle for use, and it is actuated as follows. Referring the annexed FIG. 4a, in case that the gas is infused through the tank port 2 in the canister housing 10, the evaporating gas flows into the first chamber 12 and the second chamber 14 of the canister housing 10, connected with the tank port 2.

The evaporating gas in the first, and second chamber 12, 14 is absorbed by the active carbon 3 (referring FIG. 2), and the absorption is created as it is distributed evenly between the porous structure formed in the active carbon 3.

The heat is produced when the evaporating gas is absorbed by the active carbon 3, and the exothermic reaction is created throughout the active carbon 3 filled in the first chamber 12 and the second chamber 14.

At the same time, the first and second absorption and desorption improver 22, 24 in the first chamber 12 and the second chamber 14 is made of copper as material, the heat contained in begins to conduct into the first and second absorption and desorption improver 22, 24. As described in the magnified view of FIG. 4a, sodium thiosulfate ($Na_2S_2O_3.5H_2O$), the heat accumulation material 26 (referring FIG. 2) filled in the first and second absorption and desorption improver 22, 24 is filled in liquid state of the condition (a), before the active carbon 3 produces heat, then, it changes phase to solid state of the condition (b), as it absorbs conduction heat from the active carbon 3.

As it were, the absorption heat in the active carbon 3 is absorbed as the energy needed for phase change of sodium thiosulfate ($Na_2S_2O_3.5H_2O$) from solid state to liquid state, then it prevents the temperature elevation in the first chamber 12 and the second chamber 14. Thus, the sudden elevation of the heat in the first chamber 12 and the second chamber 14 does not happen, and the evaporating gas absorption capacity of the active carbon 3 is increased.

Using in this condition, as the air is infused to atmosphere port 5 by the below atmospheric pressure of the fuzzy port 7, then it is activated as follows. Referring the annexed FIG. 4b, the air is input through the atmosphere port 5, the evaporating gas is diffused from the active carbon 3 (referring FIG. 2) filled in the first and second chamber 12, 14. As the evaporating gas absorbed inside of the active carbon is seceded, the temperature of the first and second chamber 12, 14 filled with the active carbon 3 is lowered abruptly.

As described in the annexed magnified view of FIG. 4b, with decrease of the temperature in the first and second chamber 12, 14, sodium thiosulfate ($Na_2S_2O_3.5H_2O$) in liquid state of the condition (a) during the active carbon 3 absorption, is phase changed to solid state of the condition (b) as the temperature in the first and second chamber 12, 14, in the first and second absorption and desorption improver 22, 24 is decreased.

So to speak, as endothermic reaction happened in the active carbon 3, the temperature surrounding the first and second chamber 12,14 is elevated and the sodium thiosulfate ($Na_2S_2O_3.5H_2O$) existed in liquid state in the first and second absorption and desorption improver 22,24, is changed into the energy for phase change to solid state.

So, it prevents abrupt elevation of the temperature in the first and second chamber 12, 14 as the active carbon 3 is seceded, and accelerated the seceding amount of the evaporating gas by the active carbon 3, then even if the canister is used repeatedly, it does not affect the absorption and desorption efficiency of the active carbon 3. Also, the first and second absorption and desorption improver 22, 24 is made of copper as material, and the heat conduction is happened effectively with temperature change of the active carbon 3. Referring the annexed FIG. 4a or FIG. 4b, as elucidated, the active carbon 3 is not shown to ease the description; however it is activated as the annexed FIG. 2.

Referring the annexed FIG. 4b, the air is input through the atmosphere port 5, the evaporating gas is diffused from the active carbon 3 (referring FIG. 2) filled in the first and second chamber 12, 14. As the evaporating gas absorbed inside of the active carbon is seceded, the temperature of the first and second chamber 12, 14 filled with the active carbon 3 is lowered abruptly.

Referring the annexed FIG. 4b of enlarged view, when the temperature of the first and second chamber 12, 14 is lowered, the sodium thiosulfate ($Na_2S_2O_3.5H_2O$) that filled in the first, second absorption and desorption improver 22, 24 is phase changed to solid state of phase (b) from the liquid state of phase (a) at the time of absorption of active carbon 3.

That is, while, endothermic reaction of the active carbon 3 is occurred, the temperature of surround of the first and second chamber 12, 14 filled with the active carbon 3 is lowered; the heat is changed to the needed heat for the phase change of the sodium thiosulfate ($Na_2S_2O_3.5H_2O$) that filled in the first, second absorption and desorption improver 22, 24 which phase changed to solid state from the liquid state.

And therefore, the diffusion of active carbon 3 prevent the sudden temperature decline at the inside of the first and second chamber 12, 14, and the quantity of diffusion of evaporate gas by the active carbon 3 is accelerated thus, in spite of the reciprocal use of the canister does not effect to the efficiency of the absorption and desorption of the active carbon 3.

And the material of the first, second absorption and desorption improver 22, 24 is copper, thus, the heat transfer of the temperature change of the active carbon 3 is effective.

Figure 5:
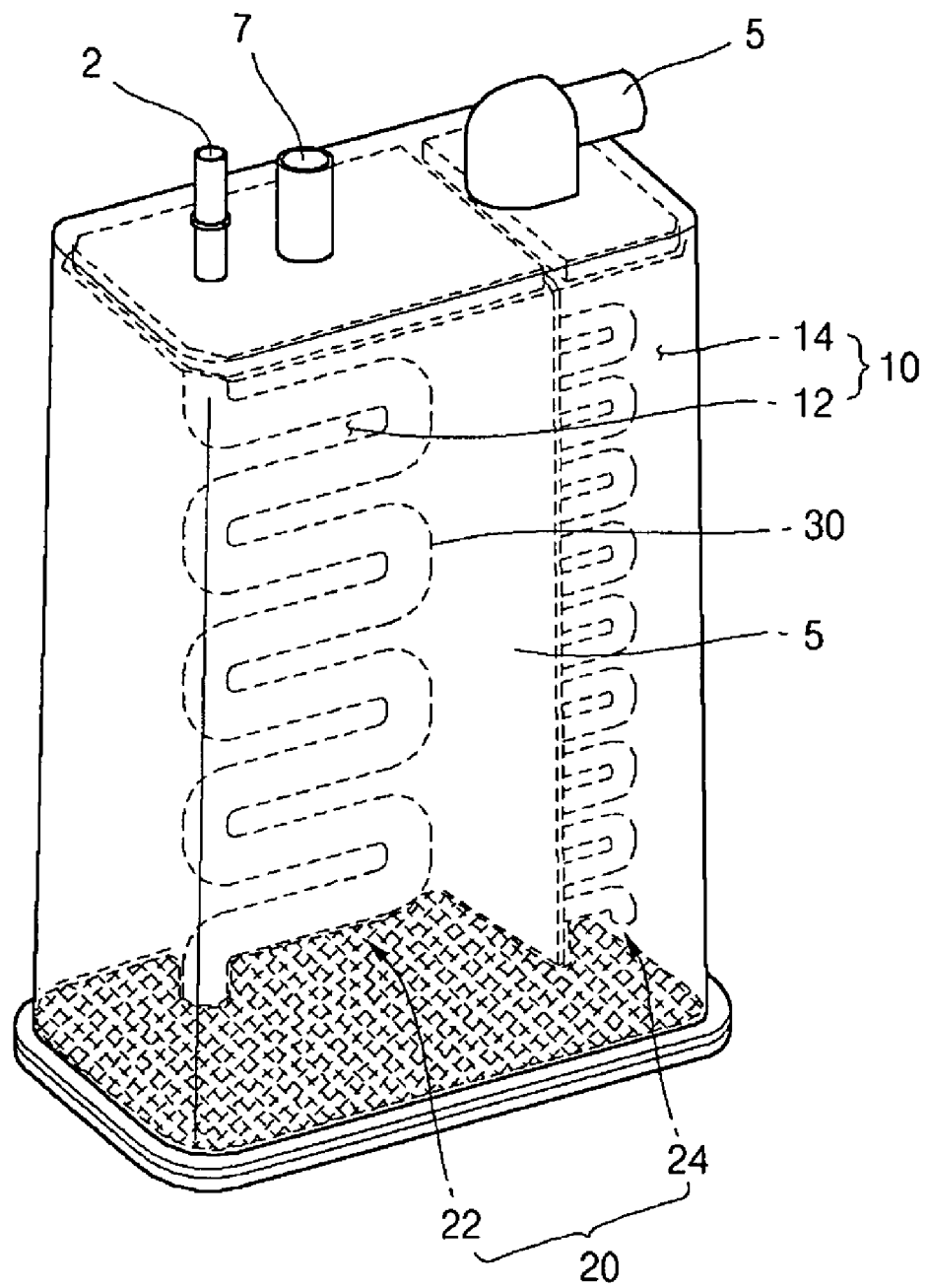
FIG. 5 is a view of illustrating the construction of another first and second absorption and improver mounted in the vehicle canister according to another preferred embodiment of the present invention.

FIG. 5 is a view of illustrating the construction of another first and second absorption and desorption improver mounted in the vehicle canister, it is able to use a construction of multiple curvature 30 formed tube shaped apart from the coil shaped constitution of the above FIG. 4a and FIG. 4b and also the effect of action is similar.

As described above, a vehicle canister according to the present invention improves the efficiency of absorption and desorption of the active carbon by installing a heat accumulate material, which is able to phase change, in the canister. Also, the effect of the present invention is to prevent the decrease of absorption efficiency and durability of the active carbon due to long time use of it by preventing the rapid change of the temperature of active carbon in the procedure of absorption and diffusion of the active carbon which is filled in the canister housing.

Although a preferred embodiment of the present invention has been described for illustrative purposes, those skilled in the art will be appreciated that various modifications, additions and substitutions are possible, without departing from the scope and spirit of the invention as disclosed in the accompanying claims.

What is claimed is:

1. A vehicle canister comprising;
a canister housing contains the first chamber which is filled with the active carbon inside and connecting with the tank port of which inlet the evaporated gas flows; and the second chamber which is filled with the active carbon inside and adjoining mounted with the first chamber via the partition wall;
the absorption and desorption improver is installed in the canister housing, receiving the heat transfer from the temperature change with the absorption and desorption of the evaporate gas flow inlet and improve the absorption and desorption efficiency of the active carbon.

2. The vehicle canister as set forth in claim 1, wherein;
the absorption and desorption improver includes the first absorption and desorption improver positioned in the first chamber and the second absorption and desorption improver positioned in the second chamber.

3. The vehicle canister as set forth in claim 2, wherein;
the first, second absorption and desorption improver formed with a coil shape and mounted on the first, second chamber.

4. The vehicle canister as set forth in claim 2, wherein;
the first, second absorption and desorption improver formed with a tube shape with multiple curvature parts.

5. The vehicle canister as set forth in claim 2, wherein;
the first, second absorption and desorption improver includes heat accumulation material which is able to phase change.

6. The vehicle canister as set forth in claim 5, wherein;
the heat accumulation material is sodium thiosulfate ($Na_2S_2O_3.5H_2O$).

7. The vehicle canister as set forth in claim 5, wherein;
the heat accumulation material is sodium phosphate ($Na_2HPO_4.12H_2O$).

8. The vehicle canister as set forth in claim 5, wherein;
more than one heat accumulation material is selected among sodium sulfate($Na_2SO_4.10H_2O$), sodium hydroxide ($NaOH.H_2O$), cyanamide ($NCNH_2$) and polyglycol as heat accumulation material.

9. The vehicle canister as set forth in claim 2, wherein;
the first, second absorption and desorption improver is using high heat conduction material.

10. The vehicle canister as set forth in claim 9, wherein;
the material of the first, second absorption and desorption improver is copper.

* * * * *